(12) United States Patent
Santos (10) Patent No.: US 10,936,437 B1
(45) Date of Patent: Mar. 2, 2021

(54) METHOD AND APPARATUS FOR DETERMINING STORAGE SYSTEM COMPLIANCE WITH SNAPSHOT POLICIES

(71) Applicant: EMC IP HOLDING COMPANY LLC, Hopkinton, MA (US)

(72) Inventor: Thiago Santos, Cork (IE)

(73) Assignee: EMC IP Holding Company LLC, Hopkinton, MA (US)

(*) Notice: Subject to any disclaimer, the term of this patent is extended or adjusted under 35 U.S.C. 154(b) by 52 days.

(21) Appl. No.: 16/587,147

(22) Filed: Sep. 30, 2019

(51) Int. Cl.
*G06F 12/00* (2006.01)
*G06F 11/14* (2006.01)
*G06F 11/30* (2006.01)
*G06F 3/06* (2006.01)

(52) U.S. Cl.
CPC ........ *G06F 11/1461* (2013.01); *G06F 3/0689* (2013.01); *G06F 11/1469* (2013.01); *G06F 11/1471* (2013.01); *G06F 11/3034* (2013.01); *G06F 11/3065* (2013.01); *G06F 2201/84* (2013.01)

(58) Field of Classification Search
CPC ............. G06F 11/1458; G06F 11/1461; G06F 11/1469; G06F 11/1471; G06F 11/3034; G06F 11/3065; G06F 2201/84; G06F 3/0683; G06F 3/0689
See application file for complete search history.

(56) References Cited

U.S. PATENT DOCUMENTS

| 5,454,099 A * | 9/1995 | Myers ................. G06F 11/1451 711/162 |
| 2019/0163765 A1* | 5/2019 | Byun ..................... G06F 11/14 |

* cited by examiner

*Primary Examiner* — Shawn X Gu
(74) *Attorney, Agent, or Firm* — Anderson Gorecki LLP (57) ABSTRACT

Snapshot policy event logs are maintained containing timestamps associated with changes to the snapshot policy over time. Storage group event logs are maintained for each storage group associated with the snapshot policy containing timestamps associated with changes to the storage group over time. Snapshot compliance is calculated by creating a timeline of the snapshot policy and creating timelines for each of the storage groups associated with the snapshot policy. The snapshot policy timeline and storage group timelines are intersected to calculate how many snapshots should have been created for each storage group associated with the snapshot policy during each snapshot policy timeline interval. The sum of all snapshots that should have been created and still be maintained at a particular point in time is compared with an actual number of snapshots maintained for the storage groups by the storage system at that point in time.

18 Claims, 10 Drawing Sheets

METHOD AND APPARATUS FOR DETERMINING STORAGE SYSTEM COMPLIANCE WITH SNAPSHOT POLICIES

BACKGROUND

This disclosure relates to computing systems and related devices and methods, and, more particularly, to a method and apparatus for determining storage system compliance with snapshot policies.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

Snapshot policy event logs are maintained containing timestamps associated with changes to the snapshot policy over time. Storage group event logs are maintained for each storage group associated with the snapshot policy containing timestamps associated with changes to the storage group over time. Snapshot compliance is calculated by creating a timeline of the snapshot policy and creating timelines for each of the storage groups associated with the snapshot policy. The snapshot policy timeline and storage group timelines are intersected to calculate how many snapshots should have been created for each storage group associated with the snapshot policy during each snapshot policy timeline interval. The sum of all snapshots that should have been created and still be maintained at a particular point in time is compared with an actual number of snapshots maintained for the storage groups by the storage system at that point in time.

DETAILED DESCRIPTION

Data protection is of paramount importance. As such, many techniques have been developed that will prevent the total loss of data. One such technique, is to mirror data that is stored on a given storage system to one or more secondary storage systems. This enables geographic diversity so that, if the storage system or the network that is used to access the storage system is compromised, it is possible to continue to have access to the data on the secondary system.

One way to implement this type of redundancy is to use a snapshot application to create point in time data copies. Snapshots enable a complete copy of a volume of data to be created, as that volume of data existed at a particular point in time. If the original volume is corrupted, lost, or inaccessible, the snapshot copy of the data may be used to resume operations with the data.

As used herein, the term "storage environment" includes a set of storage systems that includes the primary copy of the data as well as one or more backup storage systems that includes the backup copies of the data.

Storage systems may be owned and operated by the company that owns the data or, alternatively, may be shared systems commonly referred to as "cloud" resources. As used herein, the term "public cloud computing" is used to refer to the use of shared data storage resources that are provided as a service, rather than the use of dedicated private data storage resources.

As companies move to include public cloud computing as a portion or all of a storage environment, it becomes more important to monitor the public cloud resources to guarantee that the correct data backup snapshots are being created. The process of determining whether snapshots are being created and retained for the correct period of time will be referred to herein as "snapshot compliance". For example, in a storage environment where the primary copy of the data volume is stored locally on a dedicated owned storage system, and the snapshot copies of the data volume are stored in cloud storage resources, performing snapshot compliance would entail determining whether the cloud storage resources had the correct numbers of snapshots, whether those snapshots were created at the correct point in time, and otherwise determining whether the snapshot application is properly creating snapshot copies of the data volume and whether those snapshot copies are being stored (retained) for the correct period of time. Storing snapshots longer than necessary can result in paying for excessive cloud storage resources, while not storing snapshots for the whole retention period can result in loss of data, which is often unacceptable. Accordingly, it would be advantageous to provide a way to determine storage system compliance with snapshot policies to ensure that data is properly protected by the storage system, particularly in a cloud environment where at least some of the resources used to implement the storage environment are cloud storage resources.

Figure 1:
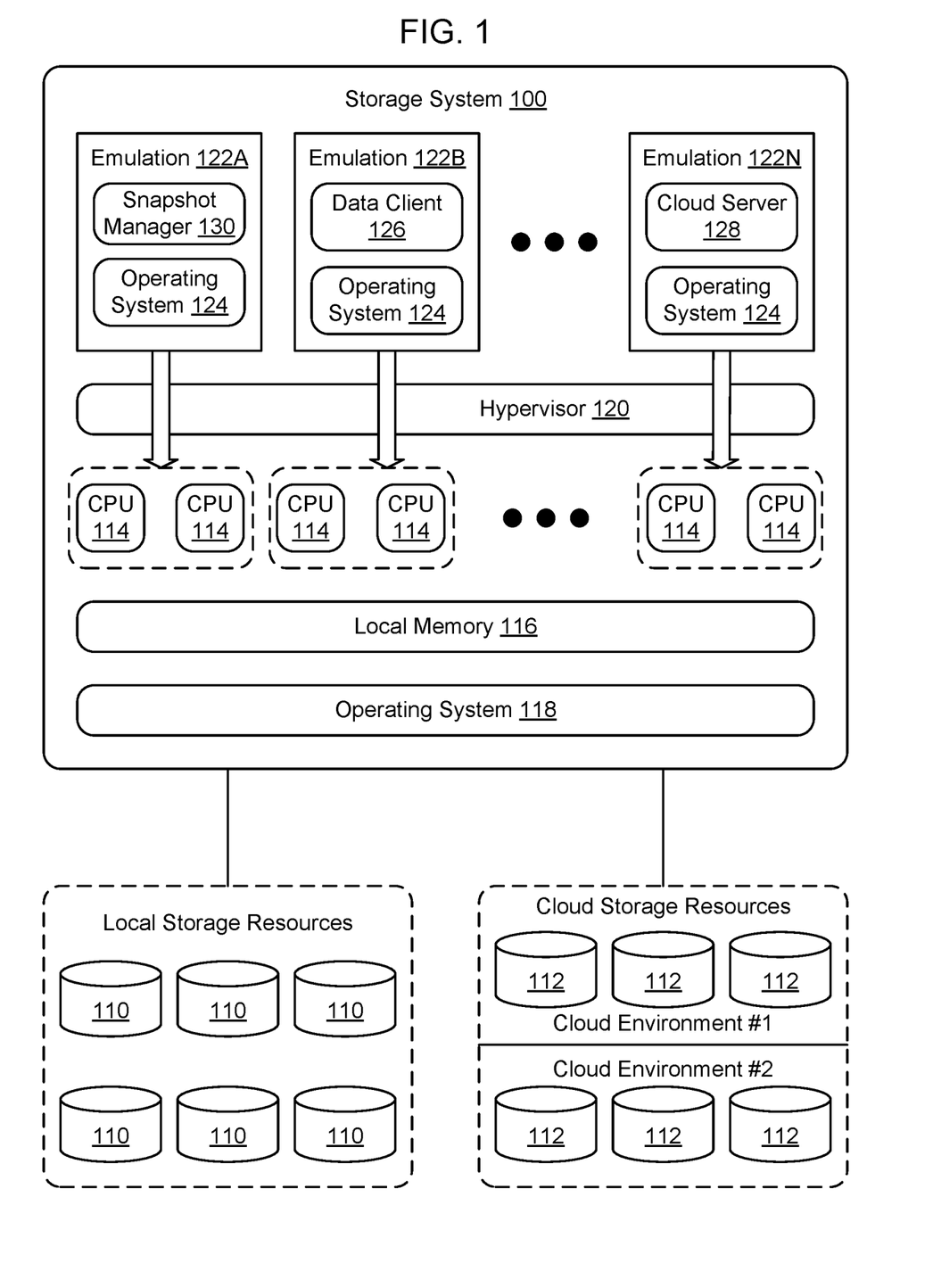
FIG. 1 is a functional block diagram of an example storage environment, according to some embodiments.

FIG. 1 is a functional block diagram of an example storage environment including a storage system 100, local storage resources 110, and cloud storage resources 112. Storage system 100 can be used to provide access to dedicated private storage resources, cloud storage resources, or both. As shown in FIG. 1, in some embodiments the storage system 100 has physical resources including a number of CPU processor cores 114, local memory 116, operating system 118, and other physical resources. In some embodiments, the storage system 100 has access to local storage resources 110 and/or cloud storage resources 112 configured to store data for the storage system 100.

Local storage resources may be storage resources dedicated to providing data storage to storage system 100 or may be shared between a set of storage systems 100. Local storage resources 110 may be implemented using numerous types of memory technologies. In some embodiments the local storage resources 110 are implemented using Non-Volatile Memory (NVM) media technologies, such as NAND-based flash, or higher-performing Storage Class Memory (SCM) media technologies such as 3D XPoint and Resistive RAM (ReRAM). Local storage resources 110 may be directly connected to the storage system 100, for example by an InfiniBand (IB) bus or fabric.

Cloud storage resources 112 are shared storage resources provided by cloud service providers, and generally include a virtualized infrastructure including a combination of hardware and software that are shared by multiple entities. Cloud service providers make software and hardware tools available for individuals and organizations who require access to such tools. Example cloud service providers include Amazon Web Services, Azure, and other similar service providers.

Multiple systems may be executing in emulations 122 instantiated in the context of the storage system 100. In some embodiments, a hypervisor 120 abstracts the physical resources of the storage system 100 from emulations 122, and allocates physical resources of storage system 100 for use by the emulations 122. Each emulation 122 has an emulation operating system 124 and one or more application processes running in the context of the emulation operating system 124.

As shown in FIG. 1, in some embodiments, one or more of the emulations 122 instantiated on storage system 100 implements a data client 126 configured to manage data that is stored in local storage resources 110, and/or cloud storage resources 112. An example data client may be a Virtual Network Attached Storage (VNAS) software application configured to enable the emulation to implement a VNAS server on a communication network or other type of server configured to interact with hosts to enable hosts to access data managed by the storage system 100. Other emulations 122 may implement other types of servers, for example as shown in FIG. 1, in some embodiments one of the emulations 122N is configured to implement a cloud server 128 to enable the storage system to interact with cloud storage resources 112 in one or more cloud environment. Cloud server 128 may interact with different sets of cloud storage resources provided by different cloud environments, such as for example a first cloud environment #1 provided by Amazon Web Services, and a second cloud environment #2 provided by Azure.

A storage system 100 may be responsible for managing hundreds of terabytes, multiple petabits, or more data, which may be logically associated with millions of separate storage volumes. One way to prevent against data loss and to provide fast failover to a redundant storage system 100 in the event of failure, is to use a snapshot application to provide point in time data copying. A "snapshot," as that term is used herein, is a copy of a volume of data as that data existed at a particular point in time. A snapshot of a file system, accordingly, is a copy of the data of the file system as the data contained in the file system existed at the point in time when the snapshot of the file system was created. A snapshot of a storage group (discussed below) is a point in time copy of all the data of each of the file systems stored within the storage group. As shown in FIG. 1, in some embodiments a snapshot manager 130 is instantiated on an emulation 122A of the storage system 100 to enable the manner in which snapshots are taken to be defined and tracked as discussed in greater detail herein.

Figure 2:
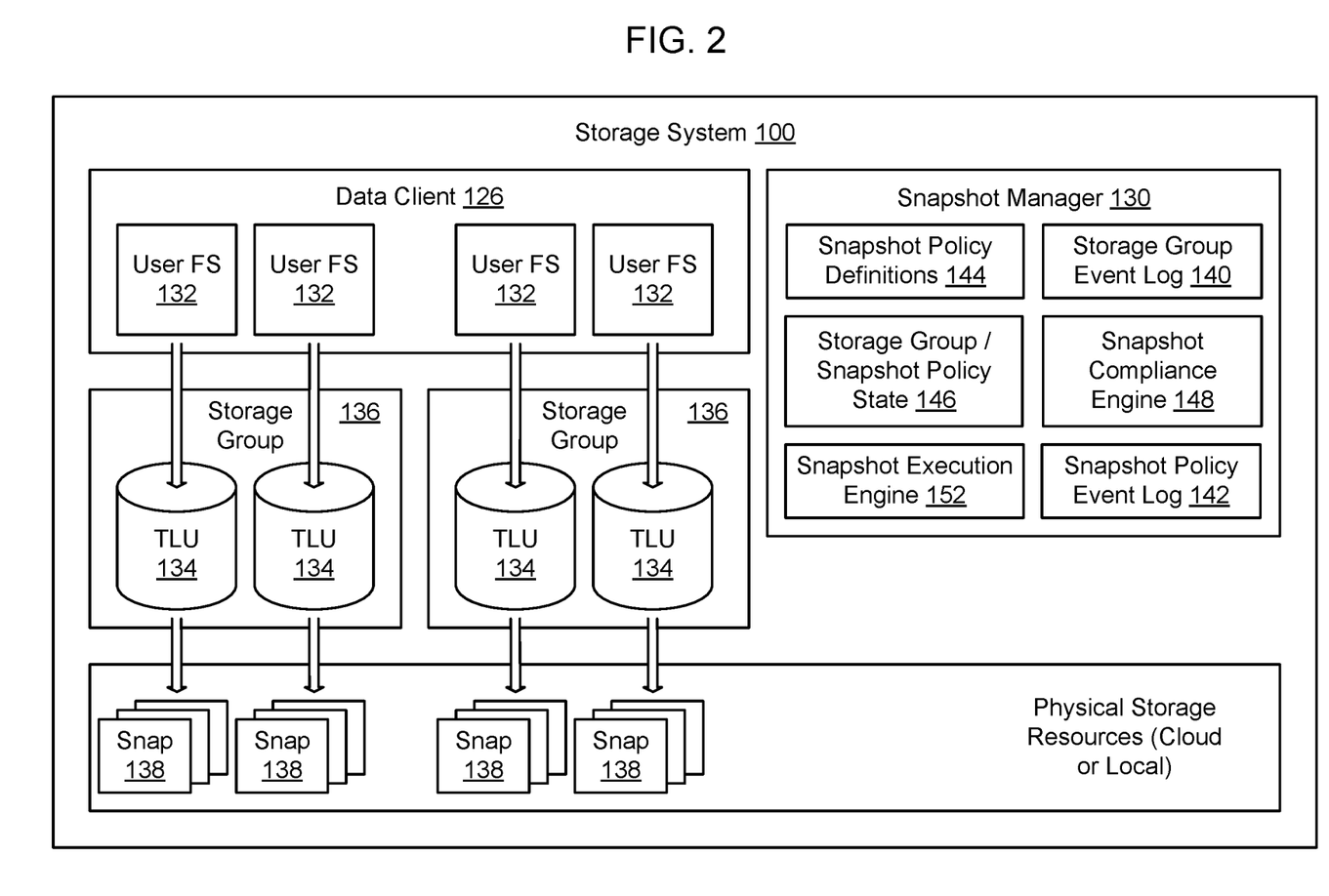
FIG. 2 is a functional block diagram of an example storage system, for use in the storage environment of FIG. 1, according to some embodiments.

FIG. 2 is a functional block diagram of an example storage system 100, such as the storage system 100 of FIG. 1. As shown in FIG. 2, in some embodiments data associated with data client 126 is stored in one or more user filesystems 132. Each user file system 132 is stored in a separate logical storage volume, referred to herein as a Thin Logical Unit (TLU) 134. A TLU 174 is a logical construct which enables the physical storage resources 110, 112 to be abstracted from the data client 126. The logical storage volume is referred to as "thin" because actual physical storage resources 110, 112 are only allocated by the storage system 100 to the TLU when used. Thus, the amount of physical storage resources allocated to a TLU will increase and decrease over time as the file system stored on the TLU increases and decreases in size. If a snapshot of the user file system is to be accessed, the snapshot copy of the user file system can be associated with a TLU and mounted to the data client 126 or to another data client 126.

TLUs are associated with storage groups 136. Different storage groups 136 may have different storage policies, which define the service levels provided by the storage system. Example service levels may include the expected average response time for an 10 operation on the TLU, the number of 10 operations that may be performed on a given TLU, and other similar parameters. TLUs may be moved from one storage group to another, but a given TLU will belong to at most one storage group at a given point in time.

In some embodiments, each storage group is associated with one or more snapshot policies. Each snapshot policy defines when snapshots 138 of the volumes of data contained in the storage group 136 should be created, and how long those snapshots 138 should be retained. Multiple snapshot policies may be applied to a given storage group, and likewise multiple storage groups may be associated with the same snapshot policy. For convenience, this disclosure will refer to storage groups being associated with snapshot policies, and snapshot policies being applied to storage groups. A storage group may be associated with a snapshot policy or disassociated with a snapshot policy at any point in time. Additionally, the storage group may be disassociated with a snapshot policy and then re-associated with the snapshot policy at a later point in time. Likewise, a storage group that is associated with a snapshot policy may be suspended or, if suspended, resumed at any point in time. Accordingly, storage groups may be dynamically associated/disassociated with a storage policy and suspended/resumed relative to the storage policy. When a snapshot policy runs, it only creates snapshots for storage groups that are associated with the policy and are not suspended at that point in time.

Additionally, the snapshot policy itself may change over time. For example, in some embodiments a snapshot policy provides (1) how frequent snapshots of the storage group should be created; (2) when, during the snapshot interval, the snapshot should be created; and (3) how long the snapshots of the storage group should be retained. An example snapshot policy might specify, for example, that snapshots should be created (1) every day; (2) at 2:00 AM; and (3) be retained for a period of 30 days. Numerous other snapshot policies may be used and this is merely intended as an example. A given snapshot policy may be amended from time to time to change the snapshot frequency, offset, retention period, or other aspects of the snapshot policy while still being assigned to one or more storage groups.

Figure 3:
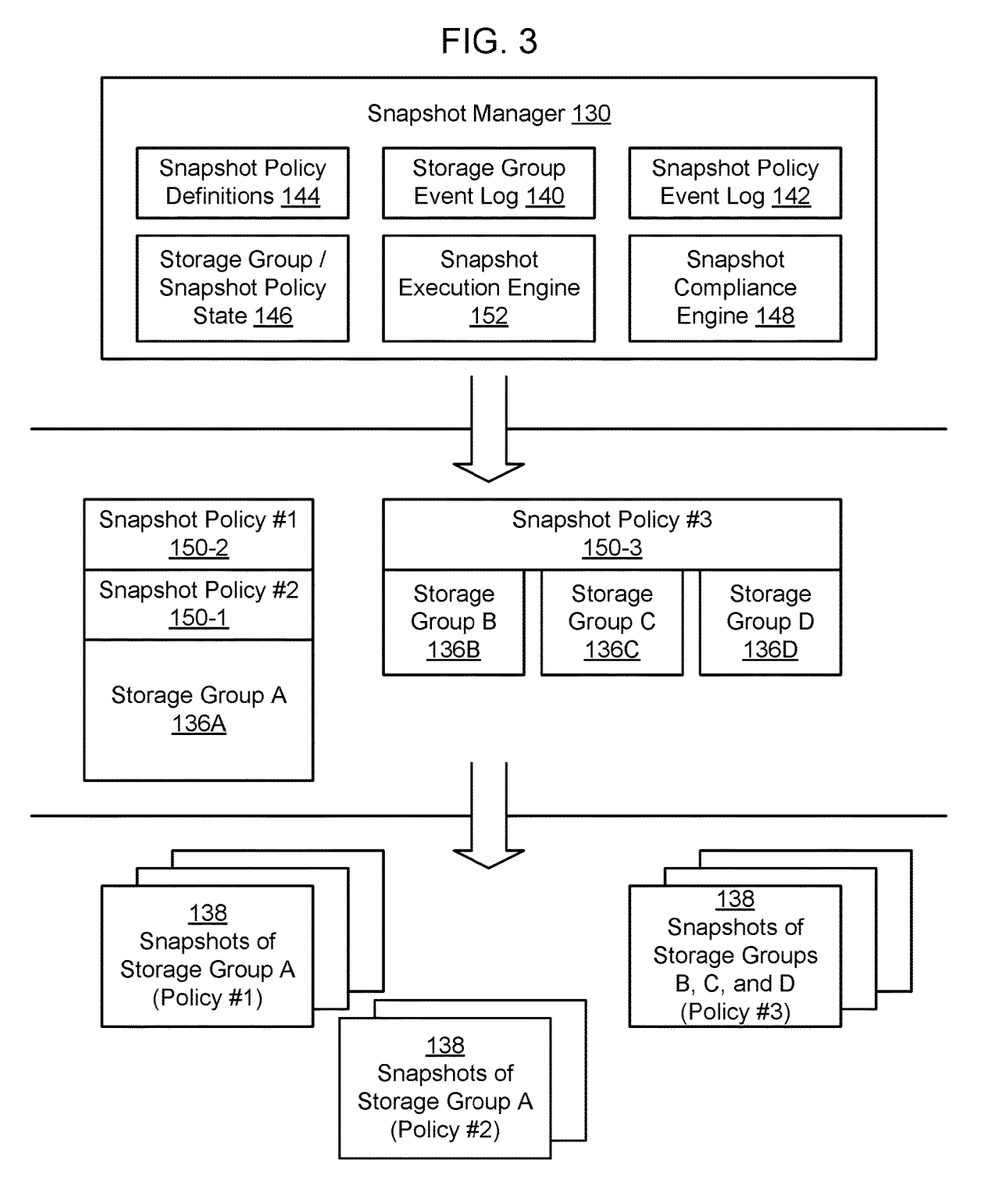
FIG. 3 is a functional block diagram of an example storage system showing application of snapshot policies to storage groups by a snapshot manager, according to some embodiments.

As shown in FIG. 3, in some embodiments the snapshot manager 130 is used to specify which snapshot policies apply to which storage groups 136 and to create and modify the parameters of the snapshot policies. The snapshot manager 130 may be implemented in an emulation 122 on storage system 100, as shown in FIG. 1, or may be implemented external to storage system 100.

In the example shown in FIG. 3, the snapshot manager 130 has associated snapshot policy 150#2 with snapshot policy 150#1 and snapshot policy 150#2. Accordingly, a snapshot execution engine 152 of storage system 100 will cause snapshots 138 to be created of storage group A at intervals defined by each of the snapshot policies 150#1 and 150#2, and stored for the retention periods specified by those policies. Similarly, storage groups 136B, 136C, and 136D have been associated with snapshot policy 150#3 and, accordingly, snapshots 138 of storage groups 136B, 136C, and 136D will be created by the snapshot execution engine 152 in accordance with the parameters associated with snapshot policy 150#3.

From a compliance perspective, it is important to know whether snapshots of the storage groups were taken at the exact moment they were supposed to be taken. Likewise, since different snapshot policies may have different retention periods, it is important to know whether the correct snapshots still are retained in the storage resources 110, 112 and are available for use as backup should the need arise.

According to some embodiments, the snapshot manager 130 implements a storage group event log 140, a snapshot policy event log 142, snapshot policy definitions 144, storage group/snapshot policy state table 146, and a snapshot compliance engine 148 that collectively enable a snapshot policy compliance determination to be calculated, by determining whether snapshots of a given storage group were created at the correct time and whether the correct snapshots 138 are retained in the storage resources 110, 112 of the storage system 100. These components of the snapshot manager 130, and the manner in which they interact, are discussed in greater detail below.

In some embodiments, the snapshot manager 130 is used to manage snapshot policy definitions 144. The snapshot policy definitions 144 may be adjusted, for example, to change how the storage system 100 handles creation of snapshots on the user filesystems 132 and how long the snapshots are retained. The snapshot manager 130 handles application of storage policies 150 to storage groups 136, and maintains storage group/snapshot policy state table 146 which is used by the snapshot execution engine 152 to determine when to create snapshots of the storage groups 136 maintained by the storage system 100. In some embodiments snapshot policies are created and modified via a snapshot manager user interface (not shown) or via the data clients 126.

In some embodiments, the storage group event log 140 is used to store a timestamp for each time a change is made to a storage group, that affects which snapshot policies apply to the storage group. Example events include when a snapshot policy applied to the storage group was suspended, when a snapshot policy applied to the storage group was resumed, when the storage group associated with the snapshot policy was suspended, when the storage group associated with the policy was resumed, when the storage group was disassociated from the snapshot policy, and when the storage group was associated with or re-associated with to the snapshot policy.

Additionally, since the parameters of a given snapshot policy can change over time, at each of these events, the storage group event log 140 stores snapshot policy relevant information at the time of the event. Example snapshot policy relevant information in some embodiments includes the snapshot interval, the snapshot offset in minutes, and the snapshot retention period in days.

Because the snapshot policy can change while applied to a storage group, in some embodiments the snapshot manager maintains a snapshot policy event log 142 containing information relative to when any change was made to the snapshot policy. Example events include a timestamp of the date the snapshot policy was created, and timestamps whenever the snapshot policy changes. Example policy changes include increasing or decreasing the snapshot creation interval, changes to the offset interval that affect when during the snapshot creation-interval the snapshot should be created, and changes to the retention period. For each policy change, in some embodiments the snapshot policy event log 142 includes a timestamp associated with the time of the change and the new parameters defining the snapshot policy as of that time.

The snapshot compliance engine 148 periodically, or on demand, performs a compliance check to determine if the correct snapshots 138 have been created and to determine if the correct snapshots 138 are retained in storage resources 110, 112 of storage system 100. A snapshot compliance determination of this nature may be particularly important in an environment in which cloud storage resources 112 are being used to implement at least some of the storage resources used to store data associated with the storage group and/or to store the snapshot copies 138. Specifically, since in a cloud environment the user does not have physical control over the storage resources but instead relies on a third-party provider to manage the storage resources, maintaining an accurate compliance picture as to whether the data is being properly backed up at the correct intervals and that the snapshot copies are being properly retained for the correct retention periods may be particularly important.

Figure 4:
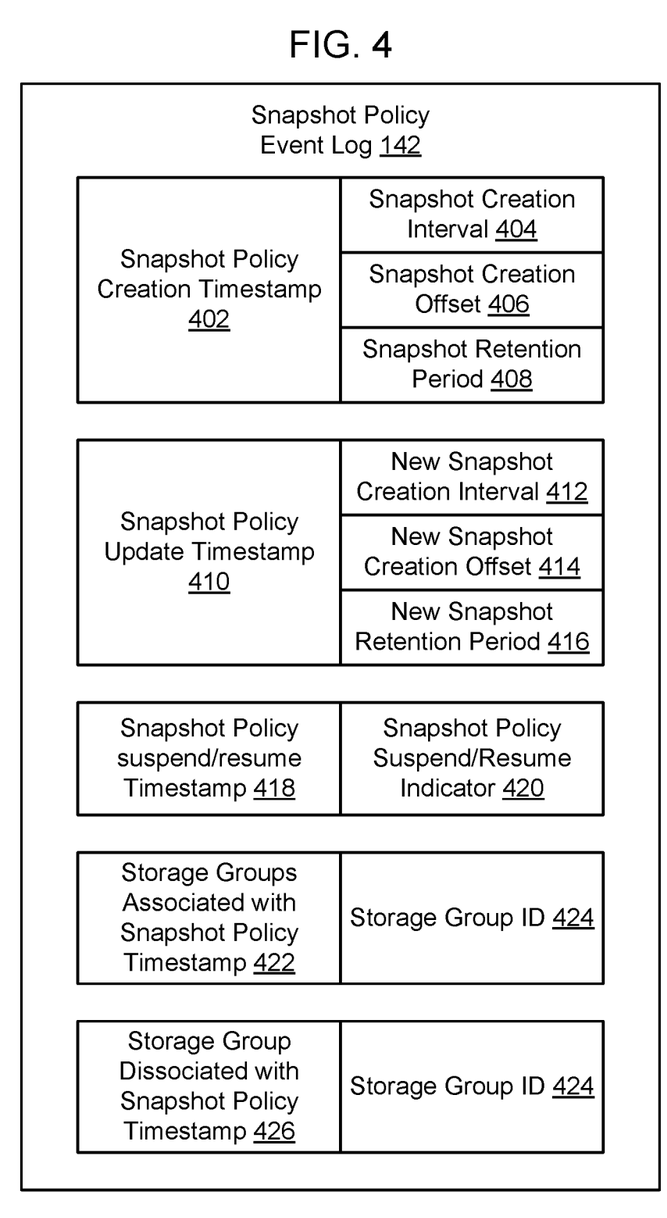
FIG. 4 is a functional block diagram of an example snapshot policy event log, according to some embodiments.

FIG. 4 is an example snapshot policy event log 142. As shown in FIG. 4, in some embodiments the snapshot policy event log 142 is implemented as a data structure having a collection of data values defining the parameters of the snapshot policy and changes to the snapshot policy over time. In some embodiments, the collection of data values includes the time of creation of the snapshot policy 402, the initial snapshot creation interval 404, the initial snapshot creation offset 406, and the initial snapshot retention period 408.

Each time the snapshot policy 150 is changed, a snapshot policy update timestamp 410 is added to the snapshot policy event log 142 along with the snapshot parameters of the updated snapshot policy. Updated parameters include the new snapshot creation interval 412, new snapshot creation offset 414, and new snapshot retention period 416.

Snapshot policies can be suspended and resumed. Each time the snapshot policy 150 is suspended or resumed, a timestamp 418 is added to the snapshot policy event log 142 along with the type of action (suspend/resume) 420.

Storage groups can be associated with the snapshot policy and disassociated with the snapshot policy. Whenever a storage group is associated with the snapshot policy 150, a timestamp 422 is added to the snapshot policy event log 142 along with a storage group identifier 424 of which storage group was associated with the snapshot policy at that point in time. Likewise, whenever a storage group is disassociated with the snapshot policy 150, a timestamp 426 is added to the snapshot policy event log 142 along with a storage group identifier 424 of which storage group was disassociated with the snapshot policy at that point in time.

A separate snapshot policy event log 142 may be maintained for each snapshot policy. Alternatively, one snapshot policy event log 142 may be maintained for a group of snapshot policies or for all snapshot policies in operation on the storage environment. Where the snapshot policy event log 142 is used to maintain historical information about more than one snapshot policy, each entry in the snapshot policy event log 142 may be identified in the data structure implementing the snapshot policy event log 142 using a snapshot policy identifier 504 (see FIG. 5).

Figure 5:
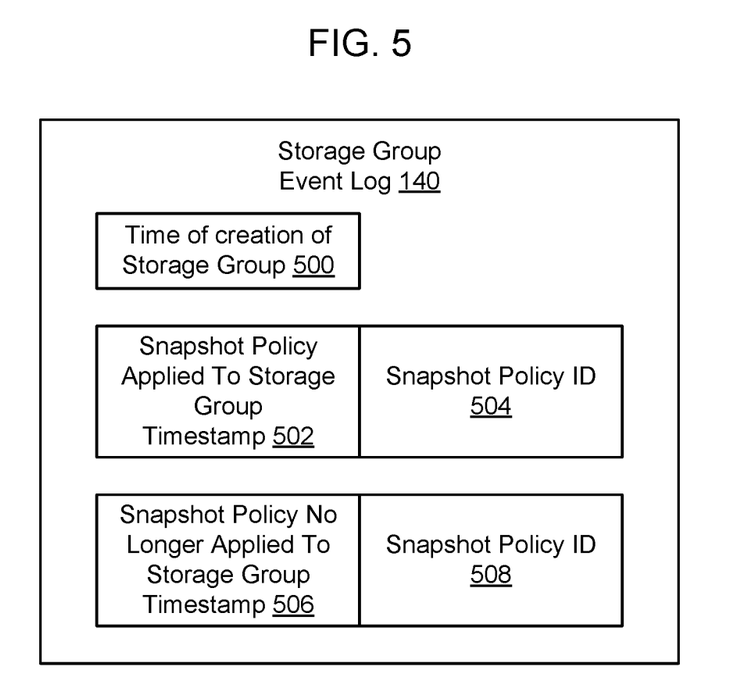
FIG. 5 is a functional block diagram of an example storage group event log, according to some embodiments.

FIG. 5 is an example storage group event log 140. As shown in FIG. 5, in some embodiments the storage group event log 140 is implemented as a data structure having a collection of data values defining events associated with the storage group over time. In some embodiments, the collection of data values includes the time of creation of the storage group 500.

Each time a snapshot policy 150 is applied to the storage group or no longer applied to the storage group, a snapshot policy update timestamp is added to the storage group event log 140. For example, as shown in FIG. 5, a timestamp 502 will be added to the storage group event log 140 whenever a snapshot policy is applied to the storage group. The snapshot policy identifier 504 will also be added to the entry in the storage group event log 140, so that the storage group event log 140 includes the identity of the snapshot policy that was applied to the storage group at that point in time. Likewise, a timestamp 506 will be added to the storage group event log 140 whenever a snapshot policy is no longer applied to the storage group. The snapshot policy identifier 508 will also be added to the entry in the storage group event log 140, so that the storage group event log 140 includes the identity of the snapshot policy that was no longer applied to the storage group at that point in time.

In some embodiments, the details of the snapshot policy parameters are not included in the storage group event log. Rather, as discussed in greater detail below, since the details of the snapshot policy are maintained in the snapshot policy event log 142, the storage group event log 140 does not need to include those details since they are otherwise available to the snapshot compliance engine 148 during a snapshot policy determination process.

A separate storage group event log 140 may be maintained for each storage group. Alternatively, one common storage group event log 140 may be maintained for several storage groups or for all storage groups in operation on the storage environment. Where the storage group event log 140 is used to maintain historical information about more than one storage group, each entry in the data structure implementing the in the storage group event log 140 may be identified using a storage group identifier 424.

Figure 6:
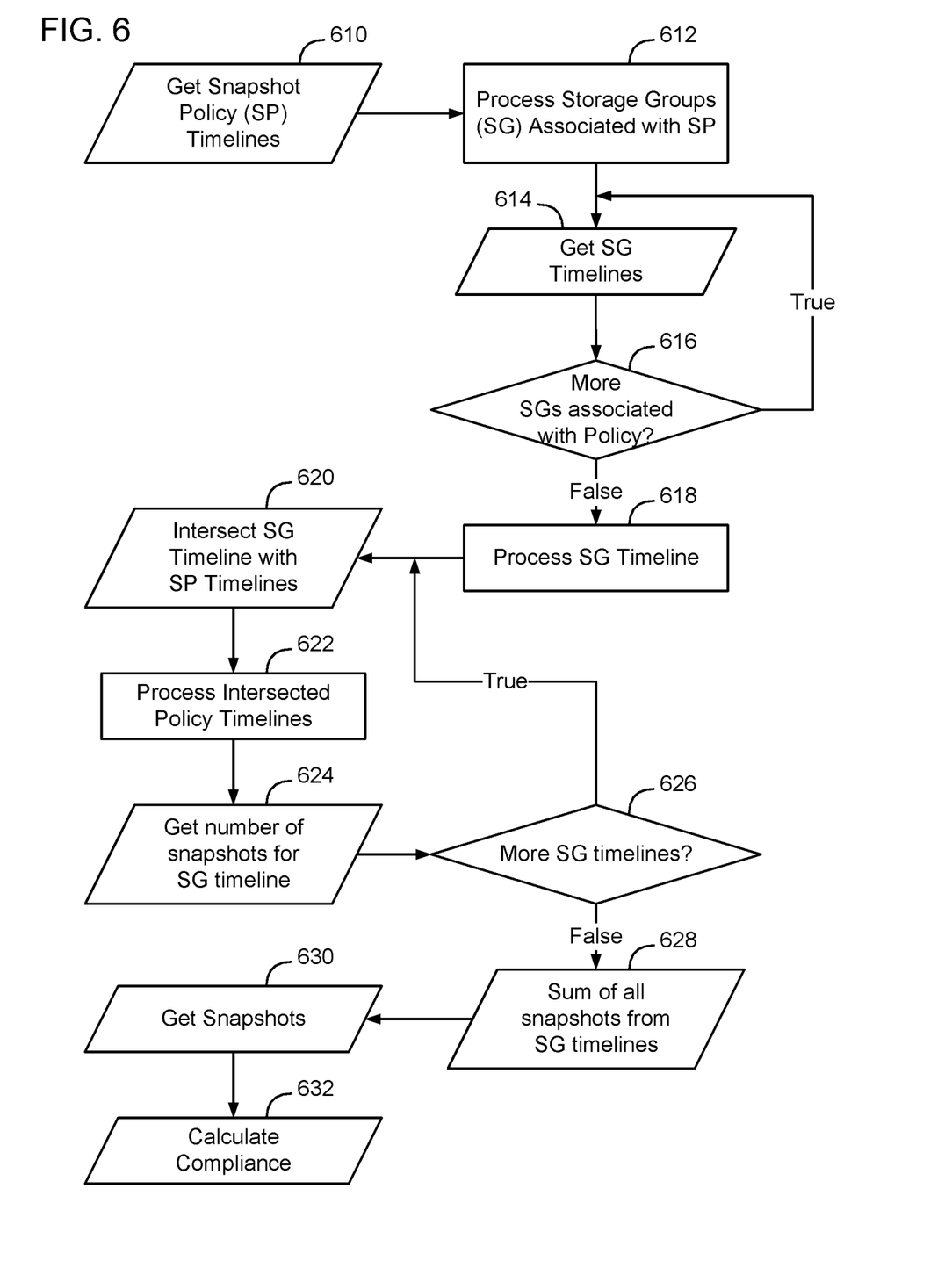
FIG. 6 is a flow chart of an example method of determining storage system compliance with snapshot policies according to some embodiments.

FIG. 6 is a flow chart of an example method of calculating storage system compliance with snapshot policies according to some embodiments. As shown in FIG. 6, in some embodiments a method of calculating snapshot compliance includes getting snapshot policy timelines (block 610). In some embodiments the snapshot policy timelines are obtained from the snapshot policy event log(s) 142 discussed above in connection with FIG. 4. As noted above, in some embodiments the snapshot policy event log 142 has timestamps 422, 426, identifying when storage groups were associated with and disassociated with the snapshot policy.

Storage groups associated with the snapshot policy are processed (block 612). In some embodiments, processing storage groups associated with the snapshot policy includes getting the storage group timeline (block 614) for each storage group associated with the snapshot policy. Storage group timelines in some embodiments are implemented using the storage group event log 140 described above in connection with FIG. 5. In some embodiments, the storage group event log 140 is obtained for a first storage group associated with the snapshot policy (block 614). Where separate storage group event logs 140 are maintained for each storage group, this may be implemented by retrieving the storage group event log for the identified storage group ID. Where a common storage group event log 140 is maintained for a set of storage groups, this may be implemented by extracting information about the identified storage group ID from the common storage group event log.

A determination is then made if there are additional storage groups associated with the snapshot policy (block 616). If there are additional storage groups associated with the snapshot policy (a determination of True at block 616), the storage group timeline for the additional storage group is obtained. This process iterates until there are no additional storage groups associated with the snapshot policy (a determination of False at block 616).

The method of calculating storage system compliance with snapshot policies then processes the storage group timelines relative to the snapshot policy timelines (block 618). In some embodiments, the method intersects the storage group timelines with the snapshot policy timelines (block 620) and processes the intersected storage group/snapshot policy timelines (block 622).

In some embodiments, processing the intersected storage group/snapshot policy timelines comprises determining the number of snapshots that should have been created for a given storage group, over the storage group timeline (block 624). The number of snapshots that should have been created for the given storage group is defined by which snapshot policy parameters applied to the storage group at each time interval of the storage group timeline.

In some embodiments, the determination of the number of snapshots for the storage group timeline is calculated for a first of the storage groups at block 624. A determination is then made if there are additional storage group timelines to be processed (block 626). If there are additional storage group timelines to be processed (a determination of True at block 626), the storage group timeline for the next storage group is obtained, intersected with the snapshot policy timeline (block 620), and processed (blocks 622, 624) to determine the number of snapshots of that storage group that should have been created based on the snapshot policies that applied to that storage group over time. This process iterates until there are no additional storage group timelines to be processed (a determination of False at block 626).

Once the last storage group timeline has been processed (a determination of False at block 626, indicating that there are no more storage group timelines to be processed), a sum is created of all snapshots from all storage group timelines (block 628). The sum created in block 628 is the sum of all of the values determined in block 624 as the process iterated the steps described in connection with blocks 620, 622, 624, and 626.

The storage system 100 is then queried to identify all snapshots of the storage groups that were actually created and exist in storage resources 110, 112 (block 630). A compliance check is then calculated (block 632) by comparing the number of snapshots that should have been created (the result of block 628) with the number of snapshots that actually have been created (the result of block 630). If the number of snapshots that should have been created matches the number of snapshots that actually were created, a determination of the compliance check 632 is that the snapshot engine is correctly implementing the snapshot policies as applied to the relevant storage groups. If the number of snapshots that should have been created does not match the number of snapshots that actually were created, this is an indication that the storage system is not properly operating to protect data and that intervention into the operation of the storage system may be warranted.

In a storage system having millions of storage groups and thousands of snapshot policies that change dynamically over time, calculating snapshot compliance enables detection of which data is not being correctly protected. This increases the reliance of the storage system 100, by enabling storage groups with insufficient data protection to be identified so that corrective action can be taken to ensure that the correct snapshot copies of the storage groups can be implemented. Particularly in a cloud environment, where the storage system 100 and/or storage resources 112 are controlled by a cloud service provider, being able to identify whether the data is properly protected can be critical to ensuring that data is properly protected against loss and will be available in the event of failover to a backup system.

In some embodiments the snapshot manager 130 has the ability to store a timestamp for each of the following situations:

The snapshot policy was suspended
   the storage group associated with the snapshot policy was suspended
the snapshot policy was resumed
   the storage group associated with the policy was resumed
the storage group was disassociated from the snapshot policy
the storage group was associated with the snapshot policy.

For each of the described situations, the snapshot manger also stores the policy relevant information at the time, including the snapshot interval, the snapshot offset in minutes, and the snapshot retention period in days.

The snapshot manager processes a snapshot policy timeline (FIG. 6, block 610) by getting all of the snapshot policy related timestamps sorted from oldest to newest for the snapshot policy. This returns a set of historic data that contains, for each entry:

entry type
   date created
   retention period changed
   interval changed
   suspended
   resumed
timestamp
retention
interval
offset in minutes For each of these snapshot policy related timestamps, the timestamps that represent the snapshot policy being suspended are filtered out. For the remaining snapshot policy timestamps, snapshot policy timelines are created between each entry that stores:

start date (timestamp of previous entry)
end date (timestamp of current entry)
offset minutes
interval
retention For each storage group associated with the policy, the snapshot manager processes a storage group timeline (FIG. 6, block 614) by sorting storage group timestamps from oldest to newest. This returns a set of historic data that contains, for each entry:

entry type
   associated
   disassociated
   suspended
   resumed Timestamp For each of these storage group related timestamps, the snapshot manager filters out the timestamps that represent storage groups being suspended or disassociated. For the remaining storage group related timestamps, the snapshot manager creates timelines between each entry that store start date (timestamp of previous entry)
end date (timestamp of current entry)

The snapshot manager then processes each storage group timeline (FIG. 6, block 618). In some embodiments, the snapshot manager filters the snapshot policy timeline and only includes the snapshot policy timelines that intersect with the storage group timeline (FIG. 6, block 620). The snapshot manager then processes each filtered snapshot policy timeline and for each storage group calculates the number of expected snapshots between the expected first snapshot time and the expected last snapshot time, filtering out snapshots that would be invalid due to expiration of the retention period. The sum of all these snapshots is then returned (FIG. 6 block 628).

The snapshot manager then queries the storage system to determine the number of snapshots of the storage groups associated with the storage policy that are currently in storage, either in local storage resources 110 or cloud storage resources 112. The number of snapshots that are currently in storage is then compared against the sum of the snapshots returned at block 628.

In some embodiments, compliance is calculated by determining if there is a difference in the actual number of snapshots and the calculated number of expected snapshots. If the difference between the actual number of snapshots and the calculated expected number of snapshots exceeds a first threshold, compliance is set as RED. If the difference between the actual number of snapshots and the calculated expected number of snapshots does not exceeds the first threshold, and is more than a second threshold, compliance is set at YELLOW. Otherwise, compliance is GREEN. This process iterates for all storage groups and all storage policies to determine overall compliance of the storage system with snapshot policies to enable the relative performance of the storage system to be evaluated to ensure that the backup processes vital to protecting data stored by the storage system are operating properly.

FIGS. 7A-7K are timelines illustrating an application of the process of calculating storage system compliance with snapshot policies in connection with an assumed a hypothetical set of storage groups and snapshot policy changes. In these timelines, the time interval has been selected to be days, although other units of time could be used instead.

Figure 7A:
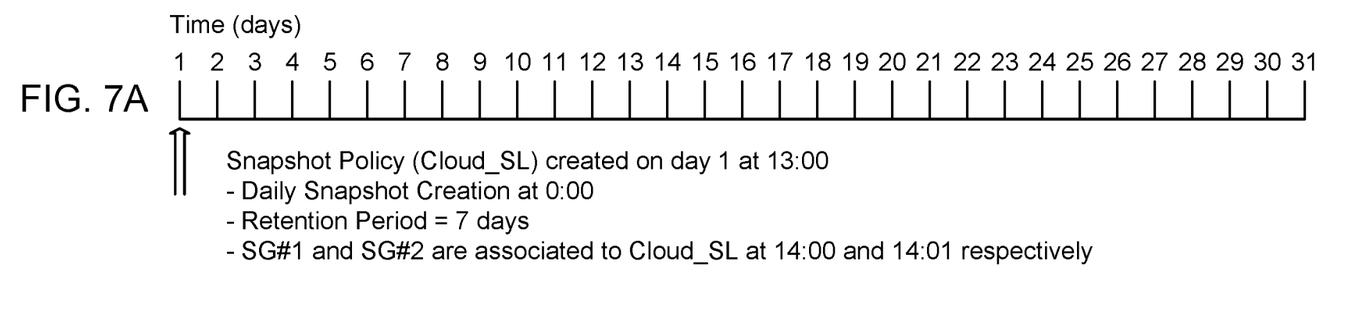
FIGS. 7A-7K are timelines illustrating an application of the process of determining storage system compliance with snapshot policies in connection with a hypothetical set of storage groups and snapshot policy changes.

As shown in FIG. 7A, in this hypothetical example, initially a snapshot policy (Cloud_SL) is created on day 1 at 1 PM (13:00 hours). The snapshot policy parameters are that a snapshot is to be created daily (snapshot creation interval 404), at midnight (0:00 hours) (snapshot creation offset 404), and retained for seven days (snapshot retention period 406). As shown in FIG. 4, in some embodiments creation of a snapshot policy causes entry of a snapshot policy creation timestamp 402 in the data structure implementing the snapshot policy event log 142. As shown in FIG. 7A, storage group 1 (SG#1) and storage group 2 (SG#2) are associated with the snapshot policy (Cloud_SL) at 14:00 and 14:01, respectively. In some embodiments, association of the storage group will cause a timestamp 502 to be added to the storage group event log 140 for each storage group that is associated with the snapshot policy.

Figure 7B:
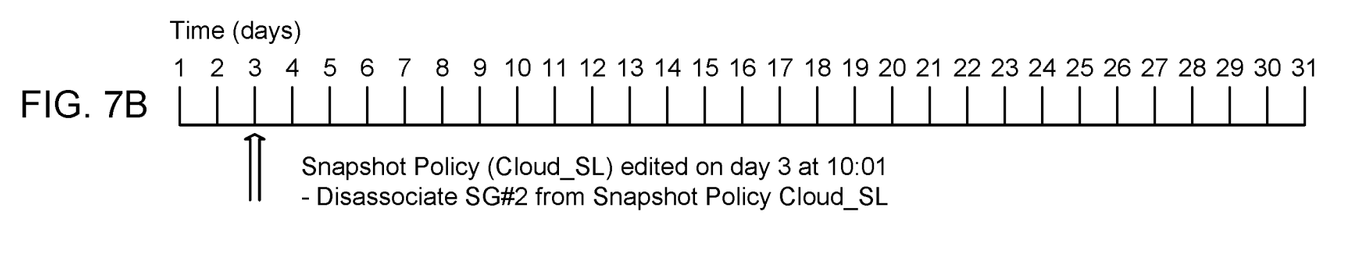

As shown in FIG. 7B, the snapshot policy (Cloud_SL) is edited on day 3 at 10:01 to disassociate service group 2

(SG#2) from the snapshot policy (Cloud_SL). This causes a timestamp 506 to be added to the storage group event log 140 for storage group 2 (SG#2). Optionally, this may also cause a storage group disassociation timestamp 426 to be added to snapshot policy event log 142 along with storage group ID 424 of SG#2.

Figure 7C:
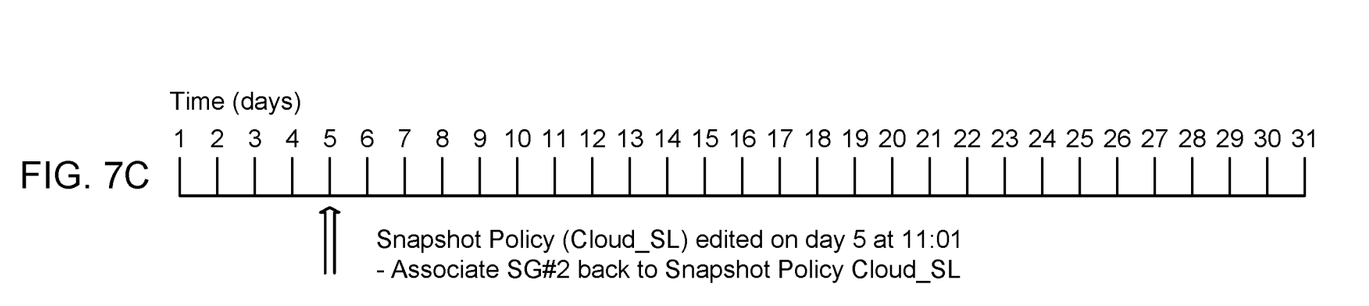

As shown in FIG. 7C, the snapshot policy (Cloud_SL) is edited on day 5 at 11:01 to associate service group 2 (SG#2) back to the snapshot policy (Cloud_SL). This causes a timestamp 502 to be added to the storage group event log 140 for storage group 2 (SG#2). Optionally, this may also cause a storage group association timestamp 422 to be added to snapshot policy event log 142 along with storage group ID 424 of SG#2.

Figure 7D:
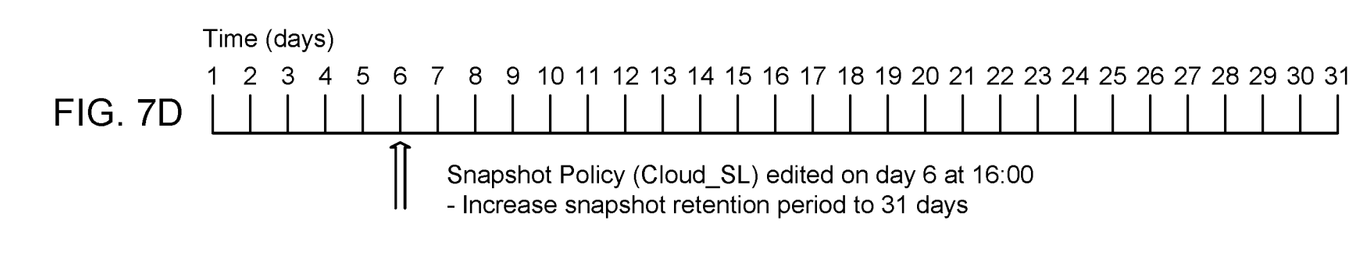

As shown in FIG. 7D, the snapshot policy (Cloud_SL) is edited on day 6 at 16:00 to increase the snapshot retention period to 31 days. This causes a timestamp 410 to be added to the snapshot policy event log 142 with an indication of the new snapshot retention period 416.

Figure 7E:
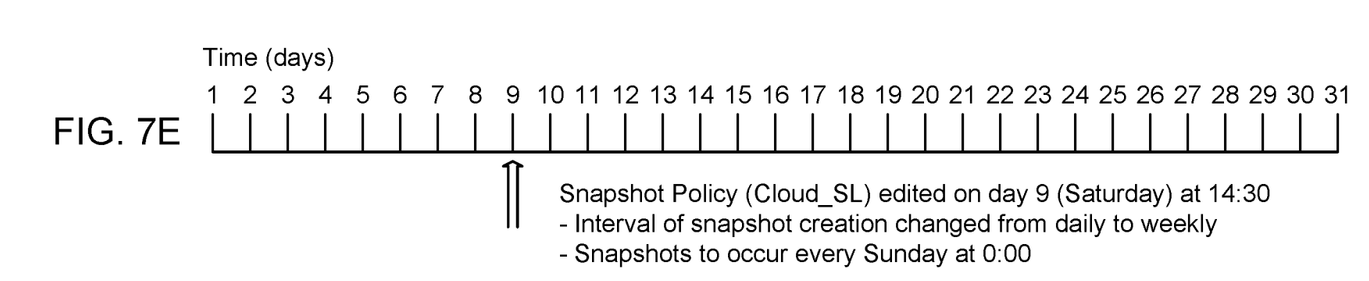

As shown in FIG. 7E, the snapshot policy (Cloud_SL) is edited on day 9 (Saturday) at 14:30 to change the interval of the snapshot creation from daily to weekly, and to specify that the snapshots are to occur every Sunday at 0:00. This snapshot policy change causes a timestamp 410 to be added to the snapshot policy event log 142 with an indication of the new snapshot creation interval 412 and new snapshot creation offset 414.

Figure 7F:
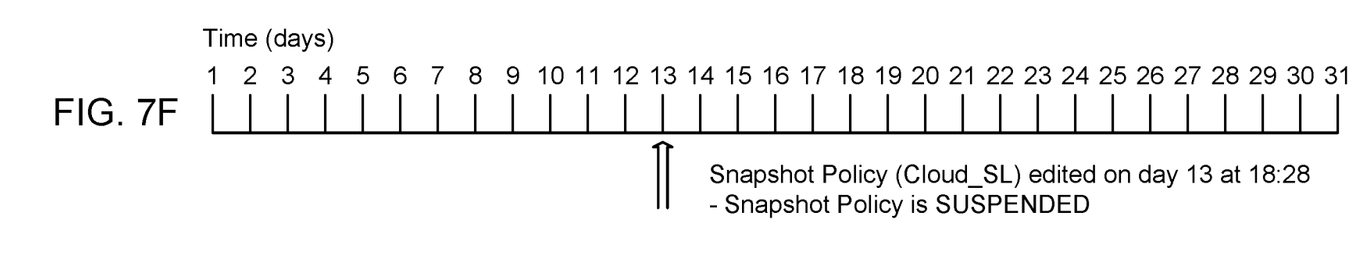

As shown in FIG. 7F, the snapshot policy (Cloud_SL) is edited on day 13 at 18:28 to change the snapshot policy to "suspended". This snapshot policy change causes a timestamp 418 to be added to the snapshot policy event log 142 with an indicator 420 that the snapshot policy was suspended.

Figure 7G:
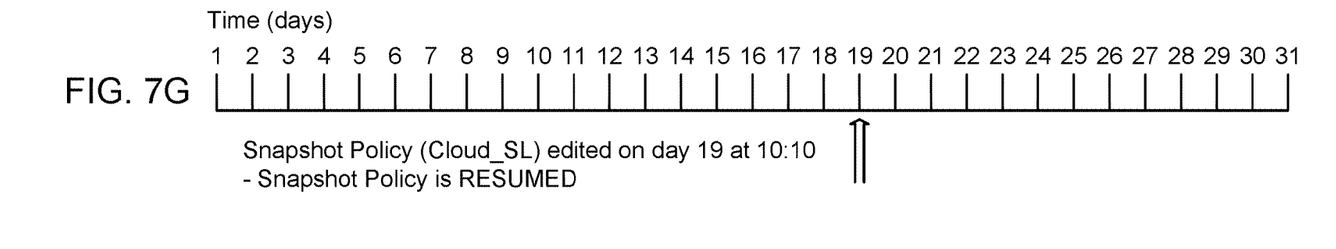

As shown in FIG. 7G, the snapshot policy (Cloud_SL) is edited on day 19 at 10:10 to change the snapshot policy to "resumed". This snapshot policy change causes a timestamp 418 to be added to the snapshot policy event log 142 with an indicator 420 that the snapshot policy was resumed.

Figure 7H:
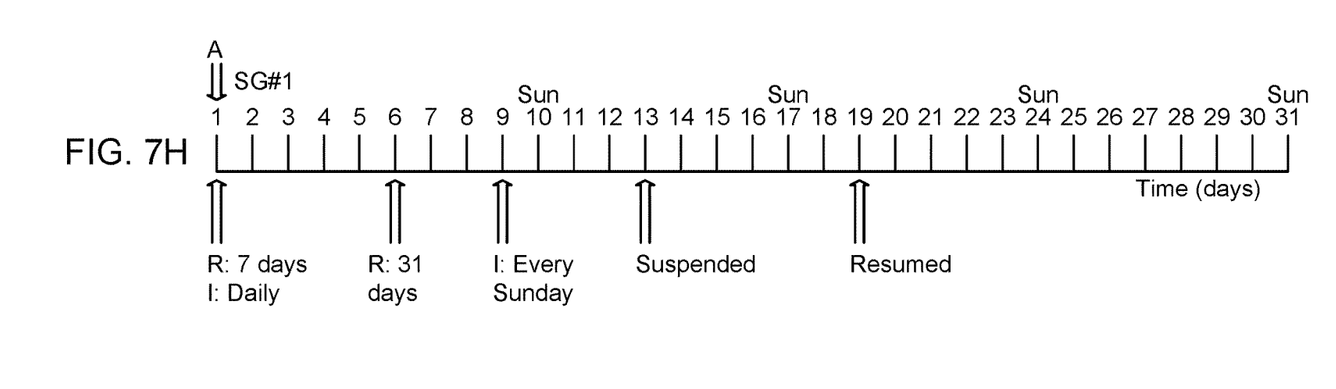
Figure 7I:
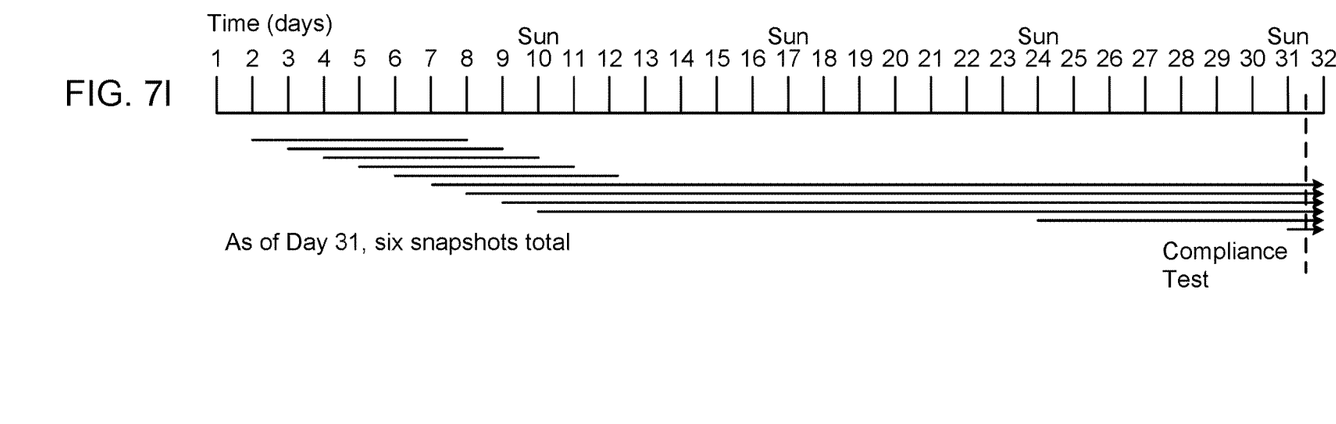

FIG. 7H shows the intersection of events associated with storage group SG#1 as contained in the storage group event log 140 for SG#1 and the changes that were made to snapshot policy (Cloud_SL) as contained in the snapshot policy event log 142 for snapshot policy (Cloud_SL). FIG. 7I shows the snapshots that were to be created based on the intersection of the timelines for SG#1 and snapshot policy (Cloud_SL). As shown in FIG. 7I, a compliance test is being implemented at noon (12:00) on day 31 using the process described in greater detail above in connection with FIG. 6.

As shown in FIGS. 7H and 7I, storage group SG#1 is associated with snapshot policy (Cloud_SL) on day 1 and never disassociated. Between day 1 and day 6, the snapshot policy (Cloud_SL) provided for snapshots to be created daily, and retained for seven days. Accordingly, between days 1 and six a total of 5 snapshots are taken on days 2, 3, 4, 5, 6, as shown using the horizontal lines below the timeline in FIG. 7I. The starting point of each line shows when the snapshot was created and the length of the line shows the retention period of the snapshot. If the retention period exceeds the timeline, the horizontal line ends with an arrow. As shown in FIG. 7I, the five snapshots taken on days 2, 3, 4, 5, 6 all have retention periods that end before the compliance test at noon on day 31.

After day 6, the retention period for the snapshots defined by snapshot policy (Cloud_SL) is increased to 31 days. Further, at this point, the snapshot creation interval still specifies that snapshots are to be created daily. Accordingly, snapshots are created on days 7, 8, and 9 with retention periods that extend beyond the compliance test at noon on day 31.

At day 9, the snapshot policy creation interval is changed from daily at midnight to weekly on every Sunday at midnight. As shown in FIGS. 7H and 7I, the following day (day 10) is a Sunday in this example, and accordingly, a snapshot is created on day 10 with a retention period that extends beyond the compliance test at noon on day 31.

On day 13 the snapshot policy is suspended and, accordingly, no snapshot is created on the following Sunday (day 17). The snapshot policy is resumed on day 19, and accordingly snapshots are created on the following two Sundays (days 24 and 31). The snapshot retention period for the snapshots taken on days 24 and 31 is 31 days, which extends beyond the compliance test at noon on day 31.

Accordingly, by processing the storage group SG#1 timeline against the snapshot policy timeline for (Cloud_SL), the process described in connection with FIG. 6 arrives at a determination in block 624 that a total of six snapshots of SG#1 should exist at the time of the compliance test at noon on day 31 (snapshots taken on days 7, 8, 9, 10, 24, and 31).

Figure 7J:
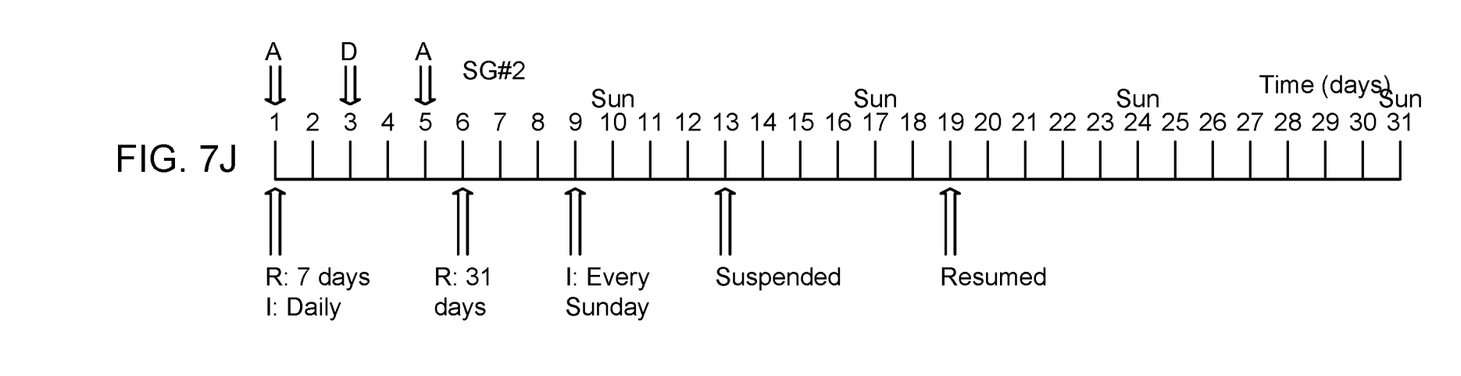
Figure 7K:
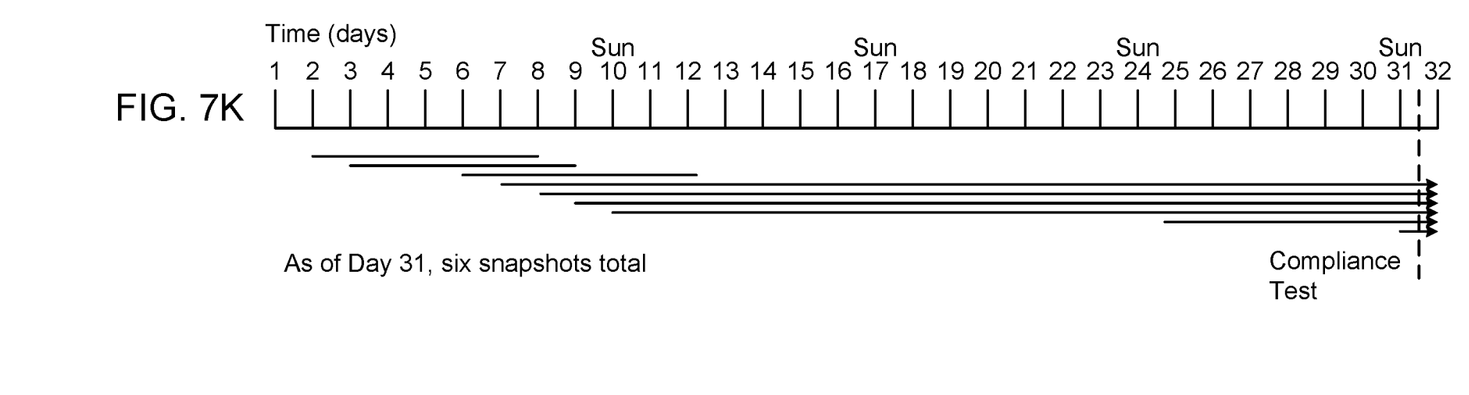

FIG. 7J shows the intersection of events associated with storage group SG#2 as contained in the storage group event log 140 for SG#2, and the changes that were made to snapshot policy (Cloud_SL) as contained in the snapshot policy event log 142 for snapshot policy (Cloud_SL). FIG. 7K shows the snapshots that were to be created based on the intersection of the timelines for SG#2 and snapshot policy (Cloud_SL). As shown in FIG. 7K, a compliance test is being implemented at noon (12:00) on day 31 using the process described in greater detail above in connection with FIG. 6.

As noted above in connection with FIGS. 7B and 7C, storage group SG#2 is disassociated with the snapshot policy (Cloud_SL) on day 3 and reassociated with the snapshot policy (Cloud_SL) on day 5. Thus, no snapshot would have been created on days 4 and 5 for storage group SG#2. Accordingly, FIG. 7K shows snapshots of storage group SG#2 being taken on days 2, 3 and 6, but not on days 4 and 5. The retention period for the snapshots taken on days 2, 3, and 6 were all set to seven days and, accordingly, none of these snapshots exist at the time of the compliance test at noon on day 31.

After day 6, the retention period for the snapshots defined by snapshot policy (Cloud_SL) is increased to 31 days. Further, at this point, the snapshot creation interval still specifies that snapshots are to be created daily. Accordingly, snapshots are created on days 7, 8, and 9 with retention periods that extend beyond the compliance test at noon on day 31.

At day 9, the snapshot policy creation interval is changed from daily at midnight to weekly on every Sunday. As shown in FIGS. 7J and 7K, the following day (day 10) is a Sunday in this example, and accordingly, a snapshot is created on day 10 with a retention period that extends beyond the compliance test at noon on day 31.

On day 13 the snapshot policy is suspended and, accordingly, no snapshot is created on the following Sunday (day 17). The snapshot policy is resumed on day 19, and accordingly snapshots are created on the following two Sundays (days 24 and 31). The snapshot retention period for the snapshots taken on days 24 and 31 is 31 days, which extends beyond the compliance test at noon on day 31.

Accordingly, by processing the storage group SG#2 timeline against the snapshot policy timeline for snapshot policy (Cloud_SL), the process described in connection with FIG.

6 arrives at a determination in block 624 that a total of six snapshots of SG#2 should exist at the time of the compliance test at noon on day 31 (snapshots taken on days 7, 8, 9, 10, 24, and 31).

Since there are only two storage groups in the hypothetical illustrated in FIGS. 7A-7K, the process described in connection with FIG. 6 at block 628 will sum all of the snapshots from all of the storage groups and arrive at a determination that the storage system 100 should have a total of 12 snapshots. This number is then compared (block 632) with a number of snapshots actually reported by the storage system (block 630) to determine if the storage system is creating snapshot copies of the storage groups in compliance with the snapshot policy Cloud_SL.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of determining storage system compliance with snapshot policies, the computer program including a set of instructions which, when executed by a computer, cause the computer to perform a method comprising the steps of:

maintaining a snapshot policy event log for a snapshot policy, the snapshot policy specifying snapshot parameters including a snapshot creation interval, a snapshot creation offset, and a snapshot retention period, wherein a snapshot is a point in time copy of data stored by the storage system;

adding timestamps to the snapshot policy event log in connection with changes to the snapshot policy;

associating storage groups with the snapshot policy;

maintaining a storage group event log for each storage group associated with the snapshot policy;

adding timestamps to the storage group event log in connection with changes to the storage group;

creating snapshots of the storage groups, by the storage system, over a first period of time; and determining whether the storage system is in compliance with the snapshot policy, for all storage groups associated with the snapshot policy at an end of the first period of time, using the snapshot policy event log and the storage group event log.

2. The non-transitory tangible computer readable storage medium of claim 1, wherein determining whether the storage system is in compliance with the snapshot policy comprises calculating a sum of all snapshots that should have been created by the storage system, and should still be maintained by the storage system, at the end of the first period of time.

3. The non-transitory tangible computer readable storage medium of claim 2, wherein determining whether the storage system is in compliance with the snapshot policy further comprises retrieving a number of how many snapshot copies of the storage groups are actually maintained by the storage system at the end of the first period of time.

4. The non-transitory tangible computer readable storage medium of claim 3, wherein determining whether the storage system is in compliance with the snapshot policy further comprises comparing the sum of all snapshots that should have been created by the storage system, and should still be maintained by the storage system, at the end of the first period of time with the number of how many snapshot copies of the storage groups are actually maintained by the storage system at the end of the first period of time.

5. The non-transitory tangible computer readable storage medium of claim 1, wherein the step of determining whether the storage system is in compliance with the snapshot policy comprises:

creating a snapshot policy timeline from the snapshot policy event log;

creating a storage group timeline for each storage group associated with the snapshot policy from the storage group event log; and intersecting the storage group timelines with the snapshot policy timeline.

6. The non-transitory tangible computer readable storage medium of claim 5, wherein the timestamps in the snapshot policy event log specify points in time where changes were made to the snapshot policy parameters relative to the snapshot creation interval, snapshot creation offset, and/or snapshot retention period, such that pairs of successive timestamps specify time intervals during which the snapshot policy parameters remained constant.

7. The non-transitory tangible computer readable storage medium of claim 6, wherein the step of intersecting the storage group timelines with the snapshot policy timeline comprises determining snapshot policy parameters for each time interval, and determining which storage groups were associated with the snapshot policy during each time interval.

8. The non-transitory tangible computer readable storage medium of claim 7, wherein determining which storage groups were associated with the snapshot policy during each time interval comprises using the storage group timelines to determine whether storage groups were associated with the snapshot policy during each time interval and using the storage group timelines to determine whether storage groups were disassociated with the snapshot policy during each time interval.

9. The non-transitory tangible computer readable storage medium of claim 8, further comprising calculating how many snapshots should have been created for each storage group associated with the snapshot policy, during each interval, using the determined snapshot policy parameters for each interval.

10. A method, comprising:
- maintaining a snapshot policy event log for a snapshot policy, the snapshot policy specifying snapshot parameters including a snapshot creation interval, a snapshot creation offset, and a snapshot retention period, wherein a snapshot is a point in time copy of data stored by a storage system;
- adding timestamps to the snapshot policy event log in connection with changes to the snapshot policy;
- associating storage groups with the snapshot policy;
- maintaining a storage group event log for each storage group associated with the snapshot policy;
- adding timestamps to the storage group event log in connection with changes to the storage group;
- creating snapshots of the storage groups, by the storage system, over a first period of time; and
- determining whether the storage system is in compliance with the snapshot policy, for all storage groups associated with the snapshot policy at an end of the first period of time, using the snapshot policy event log and the storage group event log.

11. The method of claim 10, wherein determining whether the storage system is in compliance with the snapshot policy comprises calculating a sum of all snapshots that should have been created by the storage system, and should still be maintained by the storage system, at the end of the first period of time.

12. The method of claim 11, wherein determining whether the storage system is in compliance with the snapshot policy further comprises retrieving a number of how many snapshot copies of the storage groups are actually maintained by the storage system at the end of the first period of time.

13. The method of claim 12, wherein determining whether the storage system is in compliance with the snapshot policy further comprises comparing the sum of all snapshots that should have been created by the storage system, and should still be maintained by the storage system, at the end of the first period of time with the number of how many snapshot copies of the storage groups are actually maintained by the storage system at the end of the first period of time.

14. The method of claim 10, wherein the step of determining whether the storage system is in compliance with the snapshot policy comprises:
- creating a snapshot policy timeline from the snapshot policy event log;
- creating a storage group timeline for each storage group associated with the snapshot policy from the storage group event log; and
- intersecting the storage group timelines with the snapshot policy timeline.

15. The method of claim 14, wherein the timestamps in the snapshot policy event log specify points in time where changes were made to the snapshot policy parameters relative to the snapshot creation interval, snapshot creation offset, and/or snapshot retention period, such that pairs of successive timestamps specify time intervals during which the snapshot policy parameters remained constant.

16. The method of claim 15, wherein the step of intersecting the storage group timelines with the snapshot policy timeline comprises determining snapshot policy parameters for each time interval, and determining which storage groups were associated with the snapshot policy during each time interval.

17. The method of claim 16, wherein determining which storage groups were associated with the snapshot policy during each time interval comprises using the storage group timelines to determine whether storage groups were associated with the snapshot policy during each time interval and using the storage group timelines to determine whether storage groups were disassociated with the snapshot policy during each time interval.

18. The method of claim 17, further comprising calculating how many snapshots should have been created for each storage group associated with the snapshot policy, during each interval, using the determined snapshot policy parameters for each interval.

* * * * *